March 29, 1966 F. W. MOORE ET AL 3,242,643
METHOD AND APPARATUS FOR DEGASIFYING EPOXY RESIN
Filed March 4, 1963
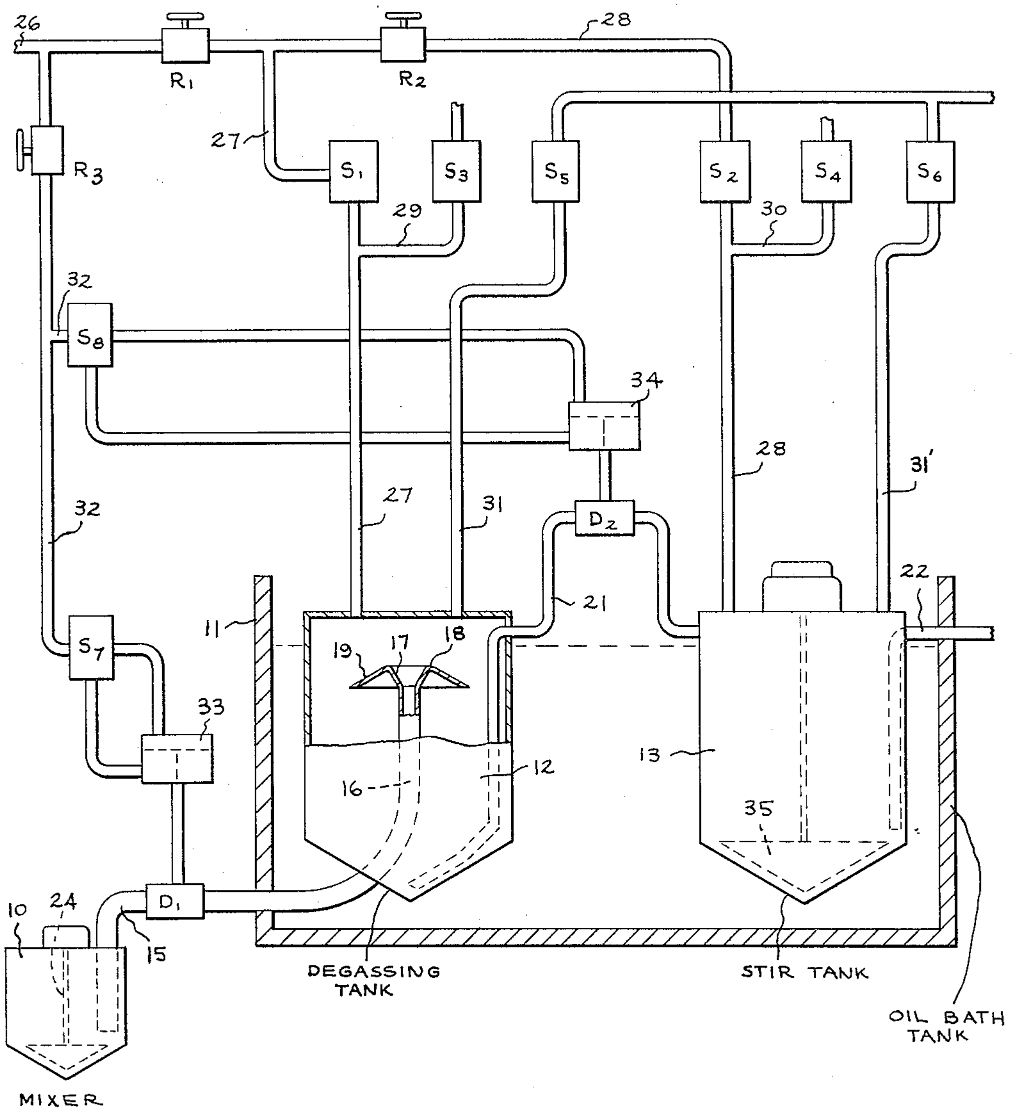
INVENTORS
FRED W. MOORE
& MERLE G. LAWSON
BY Richard L. Caslin
THEIR ATTORNEY

United States Patent Office 3,242,643

Patented Mar. 29, 1966

3,242,643

METHOD AND APPARATUS FOR DEGASIFYING EPOXY RESIN

Fred W. Moore and Merle G. Lawson, Louisville, Ky., assignors to General Electric Company, a corporation of New York Filed Mar. 4, 1963, Ser. No. 262,694

4 Claims. (Cl. 55—46)

The present invention relates to a continuous method and apparatus for degasifying and transporting an epoxy resin formulation by the use of air or vacuum pressure so as to avoid the use of direct acting pumps which will not withstand the abrasive action of the resin fillers.

This invention was devised as a factory process used for the manufacture of fractional horsepower electric motors that are encapsulated within an epoxy resin. There is a patent dealing with the design of such an electric motor, U.S. Patent 3,163,369, in the name of Marcus P. Hogue which issued on December 29, 1964, entitled Encapsulated Motor for Waste Disposer Apparatus, and is assigned to the General Electric Company, the assignee of the present invention. A preferred formulation of molding compound utilizes the basic epoxy resin Bisphenol A, a mixture of aromatic amines (m-phenylenediamine and methylenedianilene). The use of this material not only gives a previously unattainable chemical resistance, but it serves as the motor housing and as the bearing supports, as a dimensionally stable mechanical and chemical protector shield for the stator winding and it also serves well as a heat sink for the heat generated by the motor windings.

One reason for the short history of use of epoxy resins for encapsulating electric motors is that no satisfactory commercial apparatus has been available for handling the material which is heavily filled with abrasive materials and requires high temperatures in excess of 150° F. The widespread use of this material has also been delayed by the inability to intimately mix the constituents. The epoxy resins themselves are both crystalline and liquid. The crystaline resins are melted into a liquid before use. Due to the relatively high cost of the resins and because of the necessity of lowering the coefficient of thermal expansion thereof, fillers such as silica flour, calcium carbonate and many others are used. These resin pre-mixes are then mixed in the proper proportions with a liquid hardener to form a solid plastic material after curing. Many other formulations have a consistency of soft clay or bread dough at room temperature, hence the dried fillers are added at elevated temperatures to the hot resin. Even then, the consistency of the mixture is barely workable by hand. In order to process the expoxy resin so that the resulting casting is not full of holes, surface imperfections and the like, it is of primary importance to remove as many of the minute air and gas bubbles which are entrapped in the resin during the mixing operation.

The principle object of the present invention is to provide a continuous method and apparatus for degasifying and transporting a heavily filled epoxy resin formulation with air or vacuum pressure prior to the step of dispensing the resin into a finished mold for a subsequent curing operation.

A further object of the present invention is to provide a combination of vacuum and pressure steps for transporting the epoxy resin from a resin mixing tank through a degassing tank and into a stir tank in preparation for later introduction into a dispensing system where hardeners are added for pouring out a predetermined amount of resin into a heated mold in which the resin is cured to form a completed casting.

Briefly stated, in accordance with one aspect of this invention, we provide both a method and the apparatus for transporting the epoxy resin from a heated mixing tank to a heated degassing tank by means of vacuum pressure, and of spreading the resin into a thin film which passes over a sharp edge to stretch the film and exceed the surface tension of the material so as to burst gas bubbles confined in the resin, and then using a small differential pressure between the degassing tank and a heated stir tank for conveying the resin to the stir tank without re-introducing the gas thereto, and then either transferring the resin immediately into a dispensing machine or creating a vacuum in the stir tank while the resin is being stirred for prolonged periods of time so as to be held in readiness until the time for discharging the resin from the stir tank into a resin dispenser.

Our invention will be better understood from the following description taken in conjunction with the accompanying drawing and its scope will be pointed out in the appended claims.

The single figure of the drawing is a diagrammatic flow chart of a suitable apparatus for practicing the method of the present invention.

There are four main elements to the apparatus; namely, a heated mixing tank 10, a heated oil bath tank 11 in which is supported both a degassing tank 12 and a stir tank 13 so that the temperatures of the resin within the two smaller tanks may be maintained constant during the operation of the system.

It is the avowed purpose of this apparatus to mix the complete resin formulation with pigments and fillers but minus the hardeners in a heated mixing tank 10 at atmospheric pressure. The next task is to convey the resin by use of a vacuum pressure from the mixing tank 10 to a degassing tank 12, and to remove the gases from the resin while in this vacuum atmosphere. Once this operation is complete, to convey the resin to a stir tank 13 by a small pressure differential of about 15 p.s.i. between the degassing tank 12 and the stir tank and preferably to use the pressure in the stir tank to convey the resin immediately to a dispensing machine (not shown), thereby providing a continuous mixing, degassing and dispensing system. Finally, the stir tank is provided with an agitator 35 to continuously mix the resin if the resin must be retained in the stir tank rather than being supplied to the dispensing machine. Then the pressure within the tank is bled and a vacuum is pulled on the stir tank so as to prevent the introduction of air and gases back into the resin.

A pipe line 15 joins the mixing tank 10 to the bottom of the degassing tank 12 where it is connected to a generally vertical stand-pipe 16 which is supported in the center of the degassing tank 12 and has at its upper end an inverted cone or funnel 17 of ever-increasing cross-sectional area as it rises above the stand-pipe until it terminates with an annular periphery having a sharp edge as at 18. Then the inverted cone is provided with a downwardly inclined skirt member 19 all of which will be explained in greater detail hereinafter. Connected between the degassing tank 12 and the stir tank 13 is a second pipe line 21, and finally there is a discharge pipe line 22 for evacuating the stir tank and conveying the resin into a dispensing machine (not shown).

Prior to the introduction of the epoxy resin to the mixing tank 10, the resin is combined with a suitable pigment and is heated to an elevated temperature in excess of 150° F. such as in a metering and storage system disclosed in U.S. Patent 3,145,881 issued August 25, 1964 to Fred W. Moore and Merle G. Lawson, entitled Constant Temperature-Constant Volume Measuring Tank, which is assigned to the General Electric Company, the assignee of the present invention. The pigmented resin is introduced into the heated mixing tank 10 and different fillers are added up to a capacity of about 60 pounds of material where they are intimately mixed in less than 10 minutes. The material is mixed in this small quantity for two reasons: (1) To obtain better control of the quality of the mixture, and (2) to allow the formulation to be changed quickly and often without difficulty. The mixer includes a paddle or agitator 24 which not only rotates about its longitudinal vertical axis but also revolves around the center axis of the mixer in a manner similar to a pony mixer.

There is a compressed air system for controlling the atmosphere within the two heated tanks 12 and 13 as well as for controlling valve means in the pipe lines 15 and 21 for conveying the resin to and from the various tanks. Compressed air is fed into the pipe line system from line 26 which is connected to a suitable source of air pressure (not shown). This pressure line 26 is directed to both the degassing tank 12 and the stir tank 13, but first, the pressure of the air is reduced by a reducing valve R1 which lowers the pressure to a range between 45 and 55 p.s.i. There is a branch line 27 which carries this reduced pressure to a solenoid-operated valve S1 which controls the flow of the air into the degassing tank 12. Also fed from the reducing valve R1 is a second reducing valve R2 which further reduces the air pressure to between 30 and 40 p.s.i. There is a pipe line 28 connected between the second reducing valve R2 and the stir tank 13, it being understood that this pipe line 28 is provided with a solenoid-operated valve S2 which controls the flow of compressed air into the stir tank 13. Both of the pressure valves S1 and S2 are provided with a means for evacuating or bleeding the air from the two tanks 12 and 13 as by means of the branch lines 29 and 30 combined respectively with the pipe lines 27 and 28 downstream of the pressure valves S1 and S2. Each branch line 29 and 30 has a solenoid-operated bleeding valve S3 and S4 respectively so that when it is desired to evacuate the air within the two tanks the bleeding valves S3 and S4 are opened to the atmosphere so that the air pressure within the tanks will return to atmospheric pressure.

Another service provided for the two tanks 12 and 13 is a vacuum pressure service provided by pipe lines 31 and 31' respectively. Each line has its own solenoid-operated valves S5 and S6 respectively, which when opened connects the respectve tanks to a vacuum source such as a vacuum pump (not shown) that is capable of drawing a vacuum of about 6 mm. Hg in about one minute on an empty tank.

It is also necessary to provide some valves means in the first pipe line 15 as well as in the second pipe line 21 for opening and closing these lines for the operation of the system. Each line 15 and 21 is provided with a powered diaphragm valve D1 and D2 respectively, each of which is controlled by a solenoid-operated valve S7 and S8 respectively. These two valves S7 and S8 are connected to the source of air pressure 26 through a pipe line 32 which passes through a third reducing valve R3 which lowers the pressure in the pipe line 32 to between 20 and 25 p.s.i. Accordingly, if the the valve D1 is to be operated, the solenoid valve S7 is energized to cause the air pressure in the line 32 to act upon a diaphragm 33 formed as part of the valve D1 and cause it to open the pipe line 15. The diaphragm valve D2 has a similar diaphragm 34 which acts in the same manner as diaphragm 33 of valve D1.

Now for an explanation of the apparatus in a proper sequence of operation:

Operate the vacuum valve S5 so as to pull a vacuum in the degassing tank 12, it being understood that the pressure valve S1 and the bleed valve S3 must be closed.

When the vacuum has been attained in the degassing tank 12, the pipe line 15 connecting the mixing tank 10 with the degassing tank 12 must be open. This is accomplished by energizing the solenoid valve S7 thereby opening the diaphragm valve D1. Thus, the atmospheric pressure in the mixing tank 10 when exerted against the vacuum in the degassing tank 12 will cause the resin to flow through the pipe line 15 and slowly up through the stand-pipe 16 of the cone degasser 17. The flow should be at such a slow rate that the film of material flowing over the edge 18 and the lower edge of the inclined skirt 19 should be practically gas free. After the mixing tank 10 is emptied and the resin has flowed through the cone degasser 17 and has settled in the bottom of the degassing tank 12, then the solenoid valve S7 of valve D1 and the vacuum valve S5 are closed.

The resin left in the pipe line 15 between the mixer and degassing tank and in the valve D1 must be removed. This is necessary because the fillers tend to settle out of the resin and solidify. Another feature which might be used is a resin drain line from the bottom of the degassing tank 12 which would be opened during the blowing out of the tank so as to prevent the accumulation of resin in the tank. The material may be purged from the system by closing valves S3, S5 and S7 and briefly cycling the pressure valve S1 and valve D1 by valve S7 for about 2 seconds so that a sufficient pressure will be built up in the tank to push the material back into the mixer. This pressure valve should not be opened for any length of time because it is open to a 55 p.s.i. line. Care must be taken not to open the valve D1 while the degassing tank 12 is under high pressure because the hot resin will flow back into the mixer with such velocity that it will splatter into the surrounding area. If the degassing tank is known to be under high pressure it is possible to drop the pressure to a desired level by bleeding enough air to the atmosphere by opening the bleed valve S3 and having the two other valves S1 and S5 closed.

To transfer the degassed material from the tank 12 to the stir tank 13 valves S7, S3 and S5 are closed and the pressure valve S1 is opened thereby causing the degassing tank 12 to come up to full pressure of about 55 p.s.i. The operating pressure in the stir tank is raised to approximately 40 p.s.i. by opening the valve S2 and closing valves S4 and S6. In a short time there will be a pressure within the degassing tank of about 55 p.s.i. and within the stir tank of about 40 p.s.i, for a pressure differential of about 15 p.s.i. Next, the pipe line 21 is opened by energizing the valve S8 causing the valve D2 to open and allowing the pressure differential to carry the heated resin from the tank 12 into the stir tank 13 from which it is delivered to the dispensing machine in one continuous operation. When almost all of the resin has been transferred to the stir tank, the pressure gage on the stir tank will begin to indicate an increasing pressure. At this time, the valve S8 is closed to seal off the valve D2 in the pipe line 21. Then the valve S1 is closed and the bleed valve S3 is opened so as to equalize the pressure in the degassing tank 12 to atmospheric pressure. The material in the pipe line 21 and the valve D2 can be cleared by toggling the valve S8 between open and closed position so that the pressure fluctuation will complete the job satisfactorily. The stir tank includes an agitator 35 for keeping the resin continuously in motion while it is in the tank so as to prevent the fillers from settling out of the resin, as well as to provide uniform temperatures of the resin. When the material is not needed by the dispensing machine for an extended period of time, the stir tank should have a vacuum connected to it through vacuum valve S6. The pressure within the stir tank 13 must first be reduced to atmospheric pressure by closing the pressure valve S2 and opening the bleed valve S4 until the tank pressure reaches atmospheric. Then the bleed valve S4 is closed and the vacuum valve S6 is opened so that a vacuum is pulled on the stir tank.

Having described above our invention of a method and apparatus for degasifying and transporting epoxy resin it should be understood by those skilled in this art that while it may seem contradictory to degasify a material and then use air pressure to transport it from one tank to another, the degassed resin is not in a high pressure environment for a prolonged period of time. The air or gas defuses slowly through the filled resin and this is the reason for spreading the filled resin into a very thin film in the presence of a high vacuum in the cone degasser 17. Many attempts were made to use pumps to move the resin directly, but no pump could be obtained that could survive the abrasive action of the resin fillers for more than several weeks before it had to be replaced.

Modifications of this invention will occur to those skilled in this art, therefore, it is to be understood that this invention is not limited to the particular embodiments disclosed but that it is intended to cover all modifications which are within the true spirit and scope of this invention as claimed.

What we claim as new and desire to secure by Letters Patent of the United States is:

1. The method of degasifying and transporting an epoxy resin formulation to improve its insulating properties which comprises supplying epoxy resin to a heated mixing tank where the resin and its fillers are heated and thoroughly mixed, creating a vacuum in a heated degassing tank and opening a first pipe line connecting the mixing tank and the degassing tank to draw the resin into the latter tank, causing the gas bubbles in the resin to break and expel the gas from the resin, closing the first pipe line, creating a relatively low pressure in a heated stir tank, creating a pressure in the degassing tank higher than the pressure in the stir tank and higher than the prior vacuum pressure and opening a second pipe line between the degassing tank and the stir tank so that a small pressure differential will convey the resin from the degassing tank to the stir tank and out from the stir tank.

2. The method of degasifying and handling an epoxy resin formulation and the like to improve its insulating properties which comprises supplying the epoxy resin to a heated mixing tank where the resin and its fillers are heated and thoroughly mixed, creating a vacuum in a heated degassing tank and opening a first pipe line connecting the mixing tank at atmospheric pressure to the degassing tank at a vacuum pressure to draw the resin into the latter tank, causing the resin to form a thin slow moving film and bending the film over a sharp edge to burst any gas bubbles in the resin so as to expel the gas from the resin, closing the first pipe line between the mixing tank and the degassing tank, creating a relatively low pressure in a heated stir tank, creating a pressure in the degassing tank higher than the pressure in the stir tank and higher than the prior vacuum pressure and opening a second pipe line between the degassing tank and the stir tank so that a small pressure differential will convey the resin from the degassing tank to the stir tank, conveying the resin from the stir tank, and continuing to stir the resin in the stir tank until the resin is conveyed therefrom.

3. The method of degasifying an epoxy resin formulation to improve its insulating properties which comprises supplying the epoxy resin to a heated degassing tank and causing the resin to flow up a small diameter stand-pipe and to empty into an inverted cone where the resin will build up slowly within the cone and tend to spill out over the periphery thereof onto a downwardly inclined annular skirt which causes the resin to form into a thin film, the resin passing over the periphery of the skirt causing any gas bubbles in the resin to burst, creating an air pressure in a heated stir tank, increasing the pressure in the degassing tank and opening a pipe line connecting the degassing tank and the stir tank so that a small pressure differential results and will convey the resin from the degassing tank to the stir tank, closing the pipe line and bleeding the air pressure from the stir tank, and then creating a vacuum in the stir tank while the resin is being stirred for prolonged periods of time and before the resin is emptied from the stir tank for use in a subsequent molding operation.

4. A degassing tank for an epoxy resin formulation and the like comprising walls forming a tank of closed construction, the tank being provided with a compressed air line and a vacuum line, the tank having an inlet opening through which the resin enters the tank adjacent the bottom thereof, the tank including a generally vertical stand-pipe in which the resin is raised while the tank is under a vacuum, the top of the stand-pipe being provided with an open inverted cone so that the movement of the resin slows down as it enters the cone due to the greater cross-sectional area within the cone than within the stand-pipe, the upper edge of the cone being provided with a downwardly inclined continuous skirt so that the resin tends to flow out of the cone and onto the skirt and be formed into a thin film whereby the film stretches over the edges of the skirt and the gas bubbles in the resin tend to burst thereby allowing the gas to escape from the resin, a resin discharge line located along the inner surface of the tank and having a drain opening adjacent the bottom of the tank, means to close said inlet opening and to open said discharge line when the tank is to be emptied of the resin, means to close said vacuum line on the tank and to open the tank to atmospheric pressure until its pressure is equalized, and means to open the compressed air line to force the resin out of the discharge line.

References Cited by the Examiner

UNITED STATES PATENTS

| | | | |
|---|---|---|---|
| 2,136,774 | 11/1938 | Hickman | 55—55 |
| 2,663,379 | 12/1953 | Doan | 55—192 |
| 2,753,010 | 7/1956 | Walther | 55—55 |

FOREIGN PATENTS

| | | |
|---|---|---|
| 880,920 | 10/1961 | Great Britain. |

REUBEN FRIEDMAN, *Primary Examiner.*

C. N. HART, B. NOZICK, *Assistant Examiners.*